US011774328B2

(12) United States Patent
Smith

(10) Patent No.: US 11,774,328 B2
(45) Date of Patent: Oct. 3, 2023

(54) HOMOGENIZER AND METHOD OF GRINDING LARGE SAMPLE QUANTITIES

(71) Applicant: SPEX SamplePrep, LLC, Metuchen, NJ (US)

(72) Inventor: Eric Smith, Metuchen, NJ (US)

(73) Assignee: SPEX SAMPLEPREP, LLC, Metuchen, NJ (US)

( * ) Notice: Subject to any disclaimer, the term of this patent is extended or adjusted under 35 U.S.C. 154(b) by 845 days.

(21) Appl. No.: 16/802,106

(22) Filed: Feb. 26, 2020

(65) Prior Publication Data

US 2020/0271552 A1    Aug. 27, 2020

Related U.S. Application Data

(60) Provisional application No. 62/810,742, filed on Feb. 26, 2019.

(51) Int. Cl.
*G01N 1/28* (2006.01)
*B02C 17/14* (2006.01)

(52) U.S. Cl.
CPC .............. *G01N 1/286* (2013.01); *B02C 17/14* (2013.01); *G01N 2001/2866* (2013.01)

(58) Field of Classification Search
CPC . B02C 17/14; G01N 2001/2866; G01N 1/286
USPC ........................................................ 241/170
See application file for complete search history.

(56) References Cited

U.S. PATENT DOCUMENTS

| | | | |
|---|---|---|---|
| 8,016,218 B1* | 9/2011 | Friedman ................ | B01F 31/23 366/110 |
| 9,759,638 B1* | 9/2017 | Kido ...................... | G01N 1/286 |
| 9,962,717 B1* | 5/2018 | Micic ...................... | B04B 5/10 |
| 2003/0146313 A1* | 8/2003 | Deppermann .......... | B02C 17/10 241/179 |
| 2007/0069054 A1* | 3/2007 | Shomi .................... | C12M 45/02 241/199 |
| 2010/0137567 A1* | 6/2010 | Mertens ................. | B02C 17/14 536/25.41 |
| 2015/0129692 A1* | 5/2015 | Pankratz ................ | B02C 17/08 241/170 |
| 2017/0348699 A1* | 12/2017 | Zhu ........................ | B02C 19/18 |
| 2018/0154350 A1* | 6/2018 | Gilboa-Geffen .... | G01N 33/5308 |
| 2019/0212233 A1* | 7/2019 | Jovanovich ............ | C12M 47/04 |
| 2020/0150005 A1* | 5/2020 | Slutter .................... | C12M 45/02 |

(Continued)

FOREIGN PATENT DOCUMENTS

CN        107413456 A    12/2017
DE         708 694 C       7/1941

*Primary Examiner* — Omar Flores Sanchez
(74) *Attorney, Agent, or Firm* — ArentFox Schiff LLP

(57) ABSTRACT

A method of grinding large sample quantities using a bead beater homogenizer includes steps of loading a sample material into a vial having a size of 500 ml or greater having a chamber enclosed by two end walls and a cylindrical sidewall defining a central vial axis, loading a plurality of balls into the vial with the sample material, securing the vial to a movable platform of the homogenizer, and oscillating the platform in a back-and-forth motion isolated to a movement axis, thereby causing the balls to move in a circular motion along the cylindrical sidewall, wherein the central vial axis is perpendicular to the movement axis. A system of a cylindrical vial and a bead beater homogenizer is also provided.

20 Claims, 9 Drawing Sheets

(56) References Cited

U.S. PATENT DOCUMENTS

2021/0025792 A1* 1/2021 Todd .................... B02C 17/20
2021/0214673 A1* 7/2021 Jovanovich ............ C12N 1/066

* cited by examiner

Motion of the Grind Balls in a container (horizontal position)

| 2010 Speed | Jar Size | Jar Diameter | Jar Length | Ball Size and Type | Number of Balls | Motion of Balls |
|---|---|---|---|---|---|---|
| 500 - 1750 rpm | 25 oz | 89 mm | 150 mm | 9.5 mm (steel) | 15 | circular (around jar circumference) |
| 500 - 1750 rpm | 25 oz | 89 mm | 150 mm | 11 mm (steel) | 15 | circular (around jar circumference) |
| 500 - 1750 rpm | 25 oz | 89 mm | 150 mm | 14 mm (steel) | 15 | circular (around jar circumference) |
| 500 - 1750 rpm | 16 oz | 89 mm | 82 mm | 9.5 mm (steel) | 15 | circular (around jar circumference) |
| 500 - 1750 rpm | 16 oz | 89 mm | 82 mm | 11 mm (steel) | 15 | circular (around jar circumference) |
| 500 - 1500 rpm | 16 oz | 89 mm | 82 mm | 14 mm (steel) | 15 | circular (around jar circumference) |
| 1750 rpm | 16 oz | 89 mm | 82 mm | 14 mm (steel) | 15 | *chaotic dynamic (destroys the jar) |
| 500 - 1750 rpm | 6801 FM Vial | 56 mm | 93 mm | 9.5 mm (steel) | 10 | circular (around jar circumference) |
| 500 - 1750 rpm | 6881 FM Vial | 34 mm | 93 mm | 4 mm (steel) | 30 | circular (around jar circumference) |
| 500 - 1500 rpm | 6751 FM Vial | 21 mm | 93 mm | 4 mm (steel) | 20 | circular (around jar circumference) |
| 1750 rpm | 6751 FM Vial | 21 mm | 93 mm | 4 mm (steel) | 20 | *chaotic dynamic |
| 500 -1750 rpm | 8002 Plastic Jar | 53 mm | 70 mm | 9.5 mm (Plastic) | 10 | circular (around jar circumference) |
| 500 -1750 rpm | 5 oz Plastic Tube | 15 mm | 49 mm | 2 mm Zirconia | 15 | *chaotic dynamic |

FIG. 10

HOMOGENIZER AND METHOD OF GRINDING LARGE SAMPLE QUANTITIES

CROSS-REFERENCE TO RELATED APPLICATIONS

The present application claims the benefit of the filing date of U.S. Provisional Patent Application No. 62/810,742, filed Feb. 26, 2019, the disclosure of which is hereby incorporated herein by reference.

BACKGROUND OF THE INVENTION

In the sample preparation market, a common way of disrupting, lysing, or grinding (pulverizing) a sample for further testing is by mechanical disruption. Goals of these processes include particle size reduction; facilitation of the extraction of DNA and RNA, proteins, pesticides and other contaminates (i.e. heavy metals or other materials) by rupturing cells; and/or homogenization or mixing of a sample.

In particular, "Bead Beating" systems "grind" and pulverize a sample and use steel balls or other media like ceramics or glass to disrupt samples. The sample is shaken in some form with this process. The traditional "bead beater" instrument disrupts/lyses the sample by crushing or "beating" the sample between the top and bottom of a vial or between the balls or other media added to the vial during the process. This occurs during loading of a vial or sample holder in a vertical orientation. That is, most vials are cylindrical and are loaded vertically so that the ends of the cylinder are secured between upper and lower components of a holder or clamp, as shown in FIG. 1. Depending upon the instrument design, some of the sample lysing can occur between the media, from the media forces against the top and bottom of the sample container and from the media forces against the side walls of the sample container as the sample is agitated at speeds typically in the range of 500-4,000 revolutions per minute.

The choice of using the Bead Beater depends on the sample vial size, sample size and sample characteristics. Tough samples like rice, corn kernels, organs and fibrous plants typically require larger, and heavier balls/media, while samples like bacteria, yeast and fungi, using smaller balls/media. Samples like leaves, seeds, soil and plant materials often require some investigation on the best device and media size.

The motion found in bead beater products is a vertical or horizontal motion that forces the ball media to travel to and fro within the confines of the vertical height or width of the vial or a combination motion that imparts some vortexing of the sample and media to and fro within the sample vial. This vortexing is common among existing instruments to increase agitation, and results in at least a slight left-right motion during agitation of the vials. The clamp is a very important component of existing bead beaters, as it must be carefully adjusted to hold vials, tubes and jars firmly in place. The up and down motion of the clamp is extremely vigorous.

While efficient for small sample quantities, the above described bead beaters have limitations as to how effective they can be as the desired quantity of the sample increases. For example, typical jar volumes on the Geno/Grinder by SPEX SamplePrep LLC and similar products are limited to single vessel volumes of 300 ml. Most sample volumes for such products are in volumes like 2 ml, 5 ml, titer plates, 50 ml and the like. With vials of enlarged sizes, existing machines cannot produce adequately ground samples regardless of the number of balls introduced in the vial or the duration of agitation. The up/down range of motion (agitation) that is necessary for very large, vertically held vials is not always great enough to have the grinding media travel between the top and bottom of a vial to allow grinding given that the vial's height must be greater to accommodate the larger volume of, for example, 740 ml and above. Even if said large vials are placed upon their side, the jar lying on the side in the horizontal direction, the travel may not be sufficient and/or the grinding energy may not be sufficient. Alternative options involve much larger, more expensive machines, which are not usually available or cost-efficient unless exceptionally large quantities of a sample must be ground. This leaves a gap in the industry for sample quantities larger than traditional bead beaters can handle but smaller than those that require expensive industrial grade grinding machines. Many user applications also require that a specific amount of sample be ground at one time. There is no option to split the required sample size into smaller sample lots or containers, which can mean that machines like the Geno/Grinder are not always adequate to handle customer needs, particularly related to larger sample quantities.

In a different type of machine, a Horizontal Tumbler type ball mill can generate a partially or semi-circular motion through rotation of the jar about its central axis while it is oriented horizontally. In a typical Horizontal Ball Mill, there are a significant number of balls used in each grind. The shearing and grinding force of the balls is obtained by the gravity of falling balls and the shearing and grinding action of samples between the balls. In the normal use of large Horizontal Ball Mills, the jar is rotated and the balls cascade inside the sample vessel reducing the sample size by action between the balls and between the balls and the side walls of the vessel. Accordingly, the rotation of the vial does not result in a continuous rotation of the balls within the vial; rather, the balls rise and fall through the central portion of the vial due to rotation of the vial. Nor are Horizontal Tumbler type ball mills equipped to oscillate containers like a vertically oriented ball mill would. This grinding method allows the Horizontal Ball Mill to be scaled up in size to a very large commercial level, such as 15 liters for example. These types of rotational ball mills are also much larger than a smaller bead beater.

Accordingly, while bead beaters have become important devices for sample grinding, further improvements are desired.

BRIEF SUMMARY OF THE INVENTION

A first aspect of the present invention is a bead beater homogenizer for grinding large sample quantities including a housing, a movable platform disposed in the housing, a motor for oscillating the platform back and forth along a movement axis, a vial holder configured to hold a cylindrical vial having a chamber enclosed by two end walls and a cylindrical sidewall defining a central vial axis, such that the central vial axis is perpendicular to the movement axis, and a clamp for securing the vial holder to the platform.

In other embodiments according to the first aspect, a system includes the homogenizer and a cylindrical vial having a chamber enclosed by two end walls and a cylindrical sidewall defining a central vial axis.

In the homogenizer or system, the vial size may be 250 ml or greater, 350 ml or greater, 500 ml or greater, or 740 ml or greater. The motor may be configured to oscillate the vial at 500 rpm or greater, 750 rpm or greater, 1000 rpm or greater, 1250 rpm or greater, 1500 rpm or greater, or 1750 rpm or greater. A plurality of balls may be provided to be placed within the vial during oscillation of the vial. A diameter of each ball may be 4 mm or greater, 7 mm or greater, 8 mm or greater, 10 mm or greater, 12 mm or greater, or 14 mm or greater. The plurality of balls may include 5 or more, but can also be 10 or more, 15 or more, 20 or more, 25 or more, or 30 or more. The motor may be configured to oscillate the vial to cause rotation of the balls. The motor may be configured to oscillate the vial without rotating the vial about the central vial axis. A substantially dry sample may be included in the vial. The cylindrical sidewall of the vial may have a diameter of 21 mm or greater, 34 mm or greater, 53 mm or greater, 56 mm or greater, or 89 mm or greater. The vial may have a length between the end walls along the central vial axis of 70 mm or greater, but can also be 82 mm or greater, 93 mm or greater, or 150 mm or greater. The back and forth motion along the movement axis may be vertical motion.

A second aspect of the present invention is a method of grinding large sample quantities using a bead beater homogenizer, the method including steps of loading a sample material into a vial having a chamber enclosed by two end walls and a cylindrical sidewall defining a central vial axis, loading a plurality of balls into the vial with the sample material, securing the vial to a movable platform disposed in a housing of the homogenizer, and oscillating the platform back and forth along a movement axis, wherein the central vial axis is perpendicular to the movement axis.

In other embodiments according to the second aspect, the step of oscillating may cause the balls to move in a circular motion along the cylindrical sidewall. The method may not include rotating the vial about the central vial axis. The step of oscillating may not rotate the vial about the central vial axis. The step of loading the sample may include loading a substantially dry, non-liquid sample material into the vial. The step of oscillating may include oscillating the vial at 500 rpm or greater, 750 rpm or greater, 1000 rpm or greater, 1250 rpm or greater, 1500 rpm or greater, or 1750 rpm or greater. The step of oscillating may include oscillating the platform in a vertical motion. The vial size may be 250 ml or greater, 350 ml or greater, 500 ml or greater, or 740 ml or greater. A diameter of each ball may be 4 mm or greater, 7 mm or greater, 8 mm or greater, 10 mm or greater, 12 mm or greater, or 14 mm or greater. The plurality of balls may include 5 or more, but can also be 10 or more, 15 or more, 20 or more, 25 or more, or 30 or more. The cylindrical sidewall of the vial may have a diameter of 21 mm or greater, 34 mm or greater, 53 mm or greater, 56 mm or greater, or 89 mm or greater. The vial may have a length between the end walls along the central vial axis of 70 mm or greater, but can also be 82 mm or greater, 93 mm or greater, or 150 mm or greater.

A third aspect of the present invention is a system including a cylindrical vial having a chamber enclosed by two end walls and a cylindrical sidewall defining a central vial axis, a plurality of balls to be placed within the vial, and a bead beater homogenizer for grinding large sample quantities. The homogenizer includes a housing, a movable platform disposed in the housing, a motor for oscillating the platform back and forth along a movement axis, wherein the motor is configured to oscillate the vial to cause rotation of the balls, wherein the motor is configured to oscillate the vial without rotating the vial about the central vial axis, a vial holder configured to hold the cylindrical vial such that the central vial axis is perpendicular to the movement axis, and a clamp for securing the vial holder to the platform, wherein the vial size is 500 ml or greater, wherein the motor is configured to oscillate the vial at 1500 rpm or greater, and wherein a diameter of each ball is 7 mm or greater.

A fourth aspect of the present invention is a method of grinding large sample quantities using a bead beater homogenizer, the method including steps of loading a sample material into a vial of 500 ml or greater having a chamber enclosed by two end walls and a cylindrical sidewall defining a central vial axis, loading a plurality of balls each having a diameter of 7 mm or greater into the vial with the sample material, securing the vial to a movable platform disposed in a housing of the homogenizer, and oscillating the platform back and forth along a movement axis at 1500 rpm or greater, wherein the central vial axis is perpendicular to the movement axis, wherein the step of oscillating causes the balls to move in a circular motion along the cylindrical sidewall, wherein the step of oscillating does not rotate the vial about the central vial axis.

A fifth aspect of the present invention is a method of grinding large sample quantities using a bead beater homogenizer, the method including steps of loading a sample material into a vial having a size of 500 ml or greater having a chamber enclosed by two end walls and a cylindrical sidewall defining a central vial axis, loading a plurality of balls into the vial with the sample material, securing the vial to a movable platform of the homogenizer, and oscillating the platform in a back-and-forth motion isolated to a movement axis, thereby causing the balls to move in a circular motion along the cylindrical sidewall, wherein the central vial axis is perpendicular to the movement axis.

In other embodiments according to the fifth aspect, the step of oscillating may not rotate the vial about the central vial axis. The step of oscillating may include oscillating the vial at 1500 rpm or greater. The step of oscillating may include oscillating the platform in a vertical motion. The step of oscillating may include oscillating the platform back and forth along a distance of 1.25 inches. The size of the vial may be 740 ml or greater. A diameter of each ball may be 7 mm or greater. The plurality of balls may include 10 or more. The cylindrical sidewall of the vial may have a diameter of 56 mm or greater. The step of oscillating may include oscillating the platform back and forth along a distance of 3.2 cm. The vial may have a length between the end walls along the central vial axis of 82 mm or greater. The step of loading the sample may include loading a substantially dry, non-liquid sample material into the vial.

A sixth aspect of the present invention is a method of grinding large sample quantities using a bead beater homogenizer, the method including steps of, loading a sample material into a vial having a diameter of 56 mm or greater having a chamber enclosed by two end walls and a cylindrical sidewall defining a central vial axis, loading a plurality of balls into the vial with the sample material, securing the vial to a movable platform of the homogenizer, and oscillating the platform in a back-and-forth motion isolated to a movement axis along a distance of 3.2 cm, thereby causing the balls to move in a circular motion along the cylindrical sidewall, wherein the central vial axis is perpendicular to the movement axis.

A seventh aspect of the present invention is a system including a cylindrical vial having a chamber enclosed by two end walls and a cylindrical sidewall defining a central vial axis, wherein the vial has a size of 500 ml or greater, and a bead beater homogenizer for grinding large sample quantities. The homogenizer includes a movable platform, a motor for oscillating the platform in a back-and-forth motion isolated to a movement axis, thereby causing rotation of the balls in a circular motion along the cylindrical sidewall, a vial holder configured to hold the cylindrical vial such that the central vial axis is perpendicular to the movement axis, and a clamp for securing the vial holder to the platform.

In other embodiments according to the seventh aspect, a plurality of balls may be placed within the vial. A diameter of each ball may be 7 mm or greater. The motor may be configured to oscillate the vial without rotating the vial about the central vial axis. The size of the vial may be 740 ml or greater. The motor may be configured to oscillate the vial at 1500 rpm or greater. The plurality of balls may include 10 or more.

BRIEF DESCRIPTION OF THE DRAWINGS

FIG. 10 is a chart showing various test data and results.

DETAILED DESCRIPTION

It has been found that an existing bead beater homogenizer, such as the Geno/Grinder, can be utilized in a different manner than previously known in order to accommodate and grind and/or homogenize larger sample quantities with excellent grinding results. That is, sample quantities that are larger than those typically used with the vials accommodated by the Geno/Grinder can still be accommodated by the Geno/Grinder in larger vials, such as 740 ml vials, albeit by using the vials in a horizontal orientation, as shown in FIG. 2.

Through testing, the inventor has learned that utilizing horizontally oriented, larger vials in the Geno/Grinder can produce ground samples that are similar to results obtained with vertically oriented vials of much smaller sizes. This solves a long standing need in the industry of increasing the quantity output in a single grinding sample without requiring a much more expensive and cumbersome machine.

Figure 2:
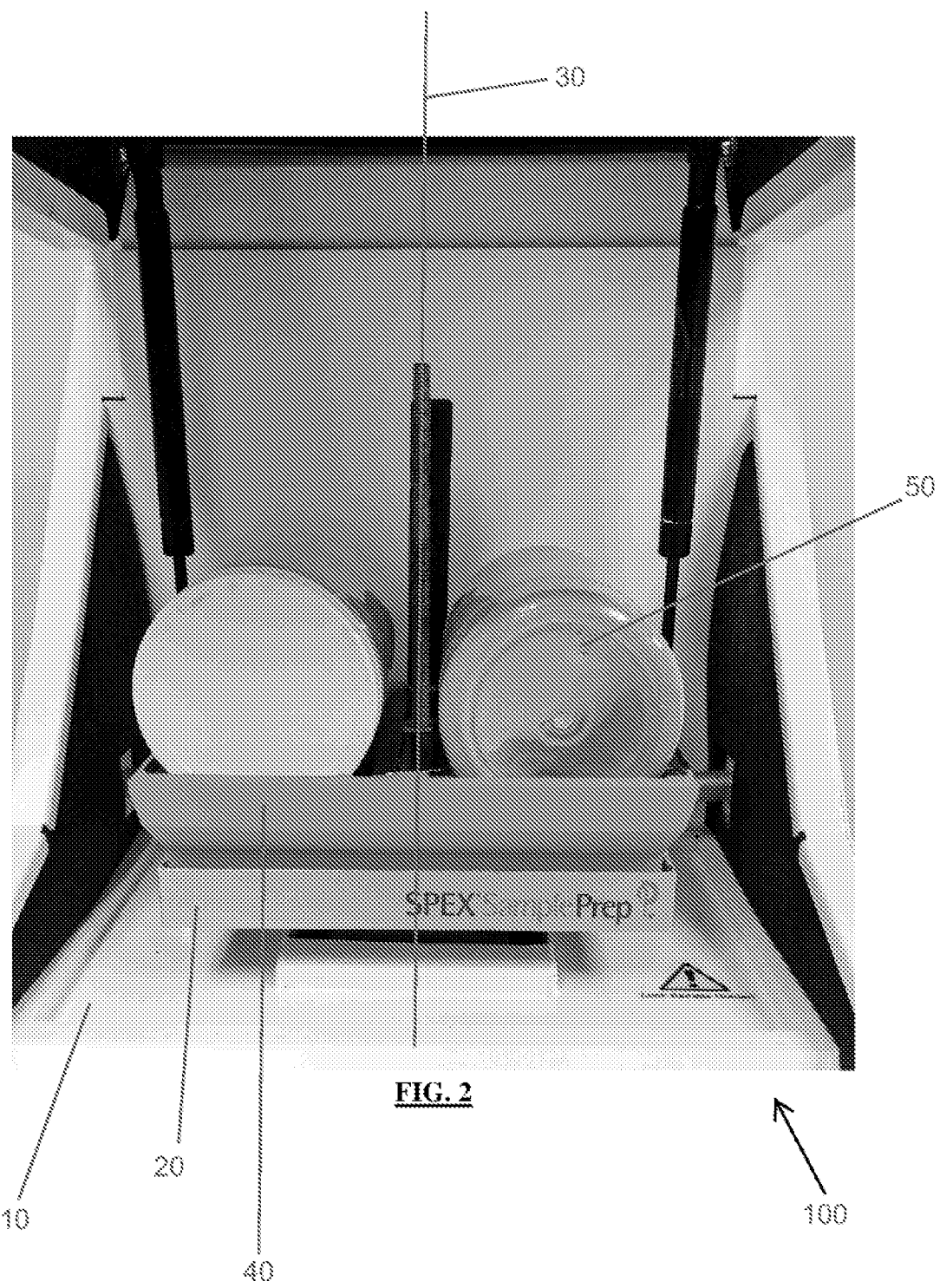
FIG. 2 is a perspective view of two 25 oz (740 ml) jars loaded into a bead beater in a horizontal orientation in accordance with one embodiment of the present invention.

In accordance with the present invention, a bead beater homogenizer 100 is shown in FIG. 2 to include a housing 10, a movable platform 20 located in the housing 10 preferably under a movable hood, and a motor internal to the housing 10 for oscillating the platform 20 back and forth along a movement axis 30, which is vertical as shown in FIG. 2. The oscillating movement occurs along an axis, i.e. a straight line, and is confined or isolated to that straight line without deviation. In one embodiment, the oscillation amplitude or displacement, i.e. the distance along which the platform moves back and forth, along that line is 1.25 inches (3.2 cm). While the housing 10 is provided for safety purposes, the housing 10 is not essential for the invention to perform its intended function of grinding. This vertical motion is a particularly efficient and effective technique of the Geno/Grinder based on its use with smaller vials in the vertical orientation, where the homogenizer causes agitation of balls within the vial up and down against the ends of the vial to grind the sample. The vertical motion described herein is intended to be exactly vertical. In practice, this motion can be within about 1 degree of the vertical axis or within about 2 degrees of the vertical axis.

Figure 11:
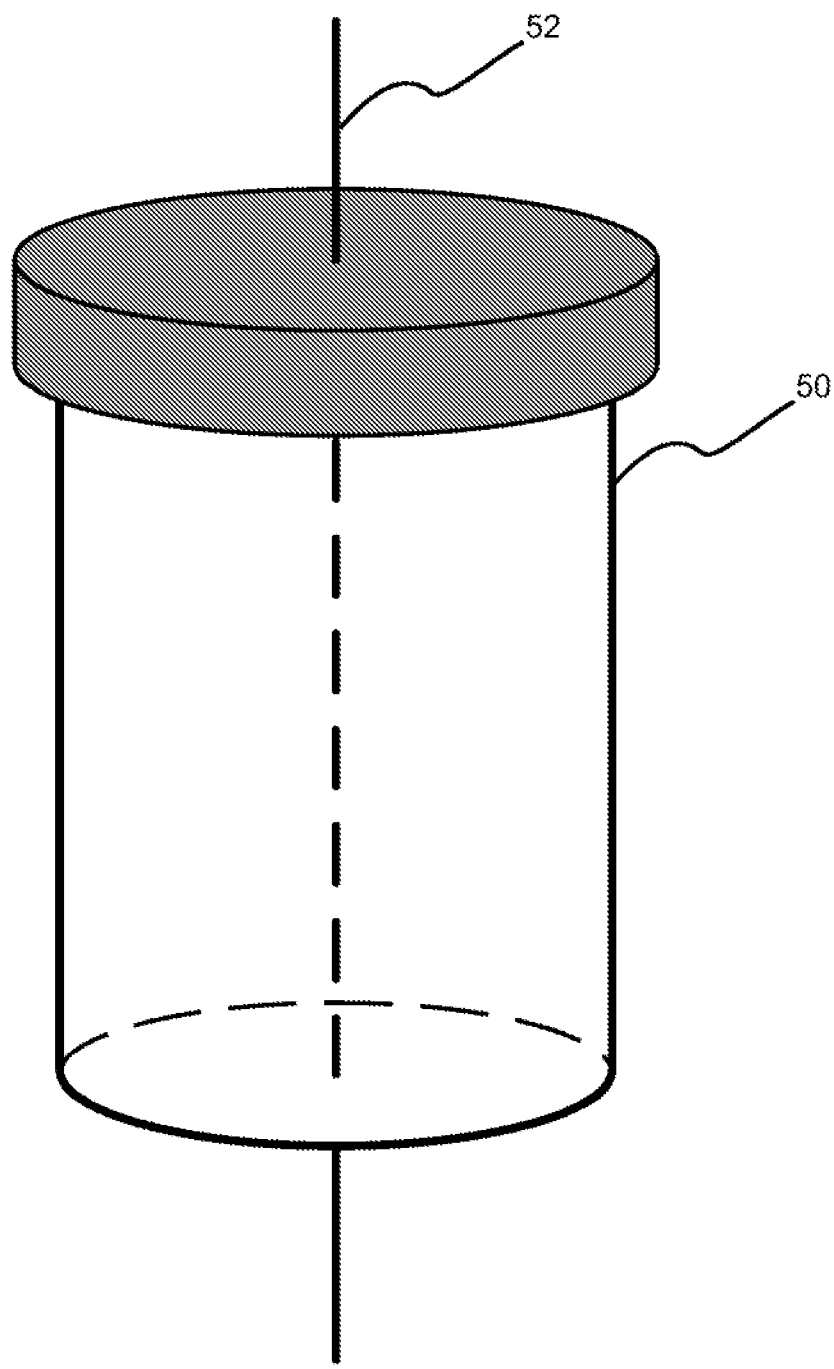
FIG. 11 is a perspective view of a jar in accordance to one embodiment of the present invention.

The embodiment shown in FIG. 2, however, includes a vial holder 40 having depressions configured to hold a cylindrical vial 50 having a chamber defined by two flat end walls and a cylindrical sidewall defining a central vial axis 52 (shown in FIG. 11). The depressions are configured as slices of a cylinder along a plane parallel to the central axis of the cylinder, as opposed to depressions that are short cylinders themselves. Deviation from the round shape of the jar is detrimental to the circular motion of the balls. A separate upper half of the vial holder 40 is not shown.

When vials 50 are loaded into the vial holder 40 of FIG. 2, the central vial axis 52 is perpendicular to the movement axis 30. This perpendicular orientation of the vials with respect to the movement axis 30, coupled with the strictly vertical movement of the vial holder 40, has not before been seen in the industry with vials of the size used herein and at speeds achieved by the machines used herein. Also, other existing machines may not necessarily adhere to a strict vertical, up-down motion like the Geno/Grinder. Such a motion (not strictly up-down) might prohibit the circular motion observed in the experiments conducted and described herein that rely on a strictly vertical motion.

When loading the clamp with sample containers in the horizontal orientation, this causes the grinding balls to move in a circular motion along the inner circumference of the container to break the sample up by shear force upon oscillation of the vials. This works particularly well with solid dry samples like corn, wheat, seeds, and hemp, as demonstrated below. Liquid samples may also be utilized. While a vertically oriented vial tends to bounce the balls back and forth against the ends of the cylindrical container, the horizontal orientation of the present invention swirls the balls around the circumference of the cylindrical container instead of bouncing them chaotically against different locations on the cylindrical wall. The circular motion of the balls improves the grinding capability of the Geno/Grinder.

This circular motion of the balls resulting from the vertical motion of the machine in a non-rotating jar, and the machine's ability to mimic the grinding action found in a horizontal ball mill in which the grinding action is derived from the rolling action between the balls and the side walls of the jar, is unique. The ball diameters are much larger than the typical grinding media used in Geno/Grinder. Typical ball diameters in current applications might be 1-6-millimeter diameter balls. In the particularly demonstrated applications below, balls in the 4-14 millimeter range yield superior results.

With reference to the perspective shown in FIG. 2, the motion of the balls in the left container move counterclockwise whereas the balls in the right container move clockwise. Furthermore, using different size balls does not change the behavior or motion. The balls all move together at the same velocity. Though certain test results have shown a departure of balls from this motion in specific conditions.

More specifically, it has been found that the balls rotate along the wall of the vial in a group. If the number of balls allows a straight line to form along the length of the vial, the rotation of the balls can occur in this straight line configuration, i.e. all balls rotating at the same time and frequency. This has been verified by observing the motion of the balls with a strobe light during oscillation of the vials.

The following examples are a series of test data run on the Geno/Grinder that provide objective evidence of the success of the present invention, particularly given the comparison against vertically oriented vials. The protocols listed below are examples of samples ground with the container in the horizontal orientation. When using different size containers or grinding balls, the same circular grinding motion is produced. As seen in the test results, only the very large 25 oz (740 ml) jar maintains the circular media motion at all speeds (500 rpm-1750 rpm) and tested ball diameters. Smaller jar diameters can generate the same circular grinding motion depending upon the ball size and grinding speed.

Experiment 1

Step 1: Place 80 g of Hemp in a 25 oz jar, similar to the jar shown in FIG. 2.

Step 2: Add fifteen 11 mm stainless steel balls and screw the lid on the jar.

Step 3: Place the sample holder in the clamp and insert the sample loaded jar. Typically two sample loaded jars are used. However, if only one sample jar is intended to be ground, an empty container is placed in the holder to properly balance the clamp.

Step 4: Slide the clamp lid onto the vertical screw and the guide it onto the upright at the back of the clamp.

Step 5: Turn the handle clockwise to tighten down the jars.

Step 6: Close the Geno/Grinder lid and run the unit with the following program: i. Set Run Time to 3.00 (minutes); ii. Set Rest Time to 0; iii. Set Cycles to 1; iv. Set Speed to 1500 (rpm). The grind time and other runtime parameters will be sample dependent.

This experiment resulted in finely ground hemp that could not be replicated in a similar procedure in which the vials were oscillated in a vertical orientation in the same machine. There is no other way to run this much sample at one time in the Geno/Grinder in one sample vial at once.

Experiment 2

Figure 3:
FIG. 3 is a perspective view of 150 g of Corn in a 25 oz jar for testing.

Step 1: Place 150 g of Corn Kernels (dry) in a 25 oz jar, as shown in FIG. 3. In other cycles, up to 200 g may be ground at once.

Step 2: Add fifteen 14 mm stainless steel balls and screw on the lid. An aluminum disc insert was also needed in the cap.

Step 3: Place sample horizontal holder in clamp and insert the sample loaded jar.

Step 4: Slide the clamp lid onto the vertical screw and the guide it onto the upright at the back of the clamp.

Step 5: Turn the handle clockwise to tighten down the jars.

Step 6: Close the Geno/Grinder lid and run the unit with the following program: i. Set Run Time to 5.00 (minutes); ii. Set Rest Time to 0; iii. Set Cycles to 1; iv. Set Speed to 1750 (rpm).

Figure 4:
FIG. 4 is a perspective view of the resultant ground sample of corn ground in a 25 oz jar in a horizontal orientation in accordance with the present invention.

The results of this experiment are shown in FIG. 4, where 150 g of finely ground dry corn is shown. The ground sample is consistent and commercially acceptable for testing.

Figure 1:
FIG. 1 is a perspective view of two 25 oz (740 ml) jars loaded into a bead beater in a conventional vertical orientation.
Figure 5:
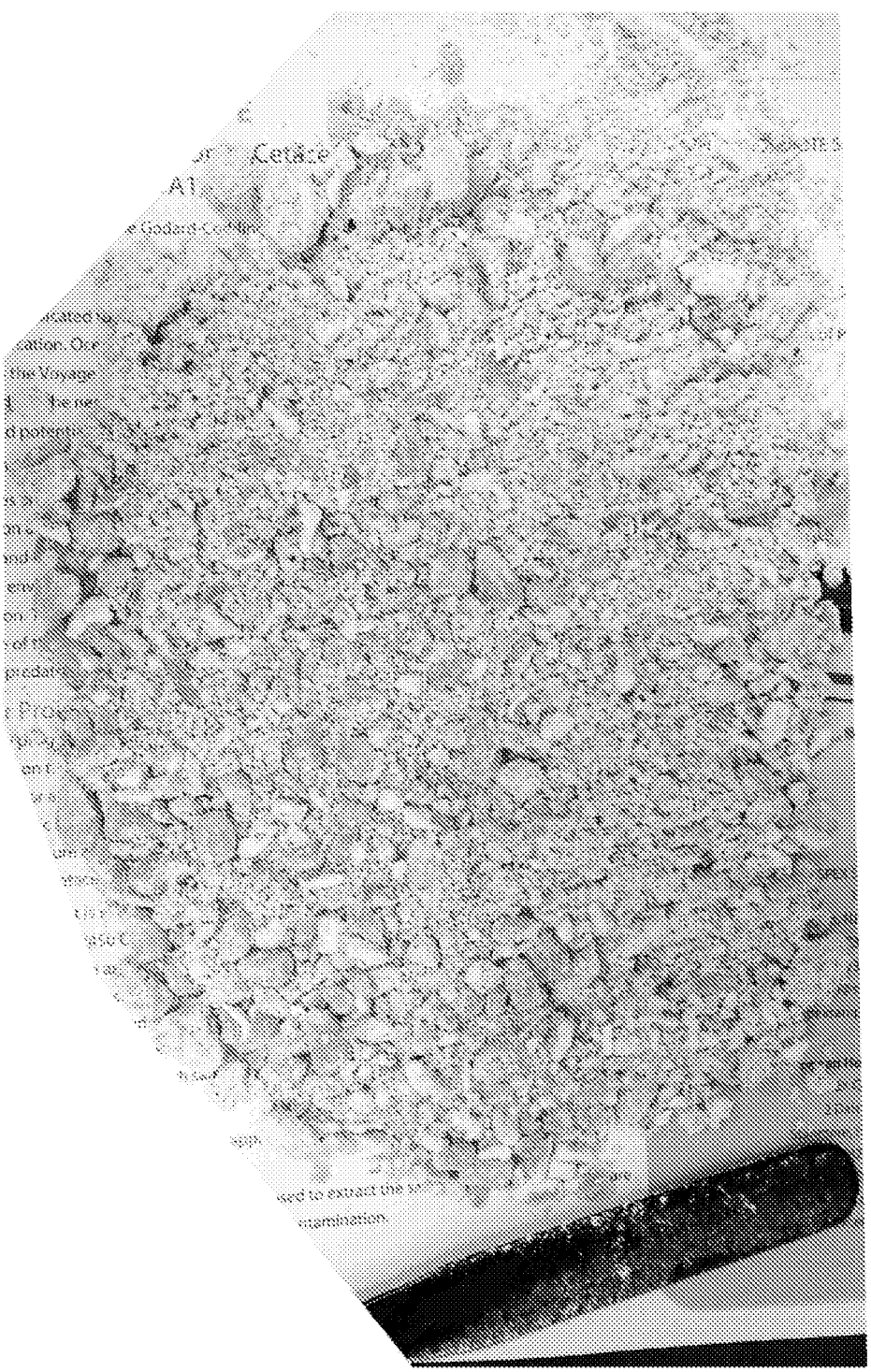
FIG. 5 is a perspective view of the resultant ground sample of corn ground in a 25 oz jar in a vertical orientation based on conventional use.

On the other hand, the same experiment was run with the same sample conditions, except that the jar was loaded in in the vertical (upright) orientation (as shown in FIG. 1). This run yielded very poor results, as illustrated in FIG. 5, where it can be seen that the sample was very inefficiently ground. While some finely ground powder was produced, a large percentage of the sample remained mostly unground such that large chunks of the corn is mixed throughout. This is clearly not an acceptable sample for testing.

This comparison demonstrates the vastly superior performance of the present invention, where large vials can be accommodated in a vial holder that secures the vials and samples in a horizontal orientation. When larger quantities of solid samples, such as 100 g are desired, it has been found that the Geno/Grinder allows unexpectedly excellent results when utilizing the vials in a horizontal orientation in comparison with a vertical orientation due to the circular motion. The sample results in FIGS. 4 and 5 make the effectiveness of the present invention very clear.

Experiment 3

Step 1: Place 100 g of Wheat Seeds (dry) in a 25 oz jar. In other cycles, up to 250 g may be ground at once.

Step 2: Add fifteen 14 mm stainless steel balls and screw on the lid. An aluminum disc insert was also needed in the cap.

Step 3: Place sample horizontal holder in clamp and insert the sample loaded jar.

Step 4: Slide the clamp lid onto the vertical screw and the guide onto the upright at the back of the clamp.

Step 5: Turn the handle clockwise to tighten down the jars.

Step 6: Close the Geno/Grinder lid and run the unit with the following program: i. Set Run Time to 2.00 (minutes); ii. Set Rest Time to 0; iii. Set Cycles to 1; iv. Set Speed to 1750 (rpm).

Figure 6:
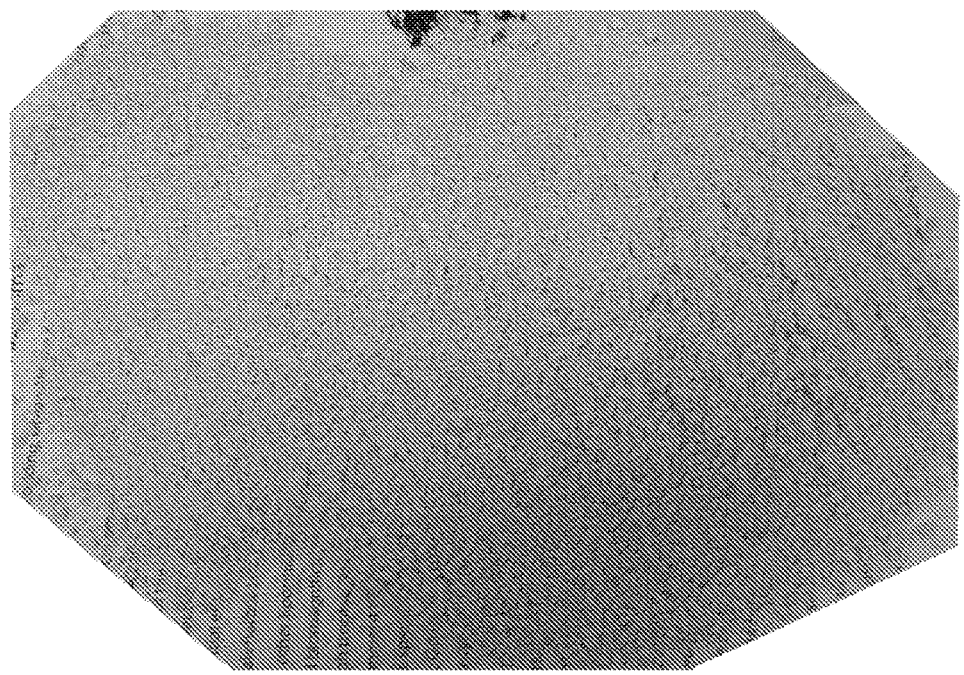
FIG. 6 is a perspective view of the resultant ground sample of wheat seeds ground in a 25 oz jar in a horizontal orientation in accordance with the present invention.
Figure 7:
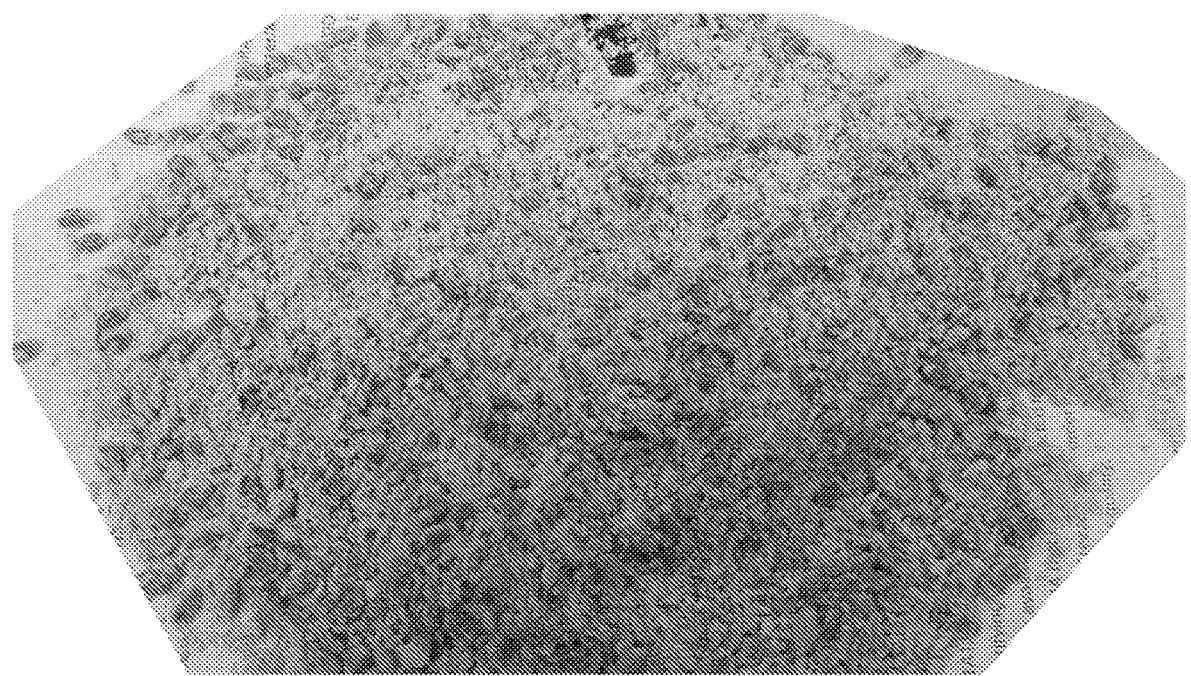
FIG. 7 is a perspective view of the resultant ground sample of wheat seeds ground in a 25 oz jar in a vertical orientation based on conventional use.

The results of this experiment are shown in FIG. 6, where again, the sample of wheat seeds is shown as finely ground even in the volume of 100 g. The same experiment was run with the same sample conditions, except that the jar was loaded in in the vertical (upright) orientation (as shown in FIG. 1). Also again, this run yielded very poor results, as illustrated in FIG. 7, where it can be seen that the sample was very inefficiently ground. Much of the sample can be seen as whole or partial wheat seeds that have not been ground to powder.

Experiment 4

Step 1: Place 30 g of Wheat Seeds (dry) in a 6801 FM vial (capacity of 200 ml (6.76 oz)), which has stainless steel end plugs and a polycarbonate center cylinder. In other cycles, up to 100 g may be ground at once.

Step 2: Add fifteen 9.5 mm stainless steel balls and screw on the lid.

Step 3: Place sample horizontal holder in clamp and insert the sample loaded jar.

Step 4: Slide the clamp lid onto the vertical screw and the guide onto the upright at the back of the clamp.

Step 5: Turn the handle clockwise to tighten down the jars.

Step 6: Close the Geno/Grinder lid and run the unit with the following program: i. Set Run Time to 2.00 (minutes); ii. Set Rest Time to 0; iii. Set Cycles to 1; iv. Set Speed to 1750 (rpm).

Figure 8:
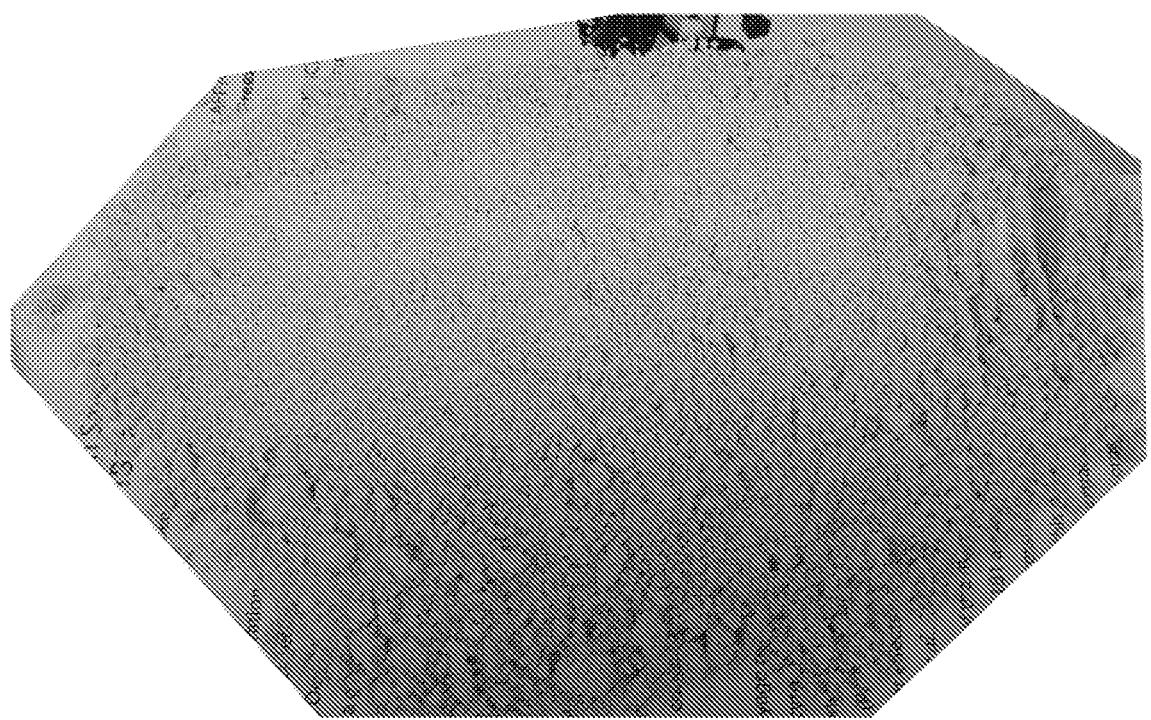
FIG. 8 is a perspective view of the resultant ground sample of wheat seeds ground in a 6801 vial in a horizontal orientation in accordance with the present invention.
Figure 9:
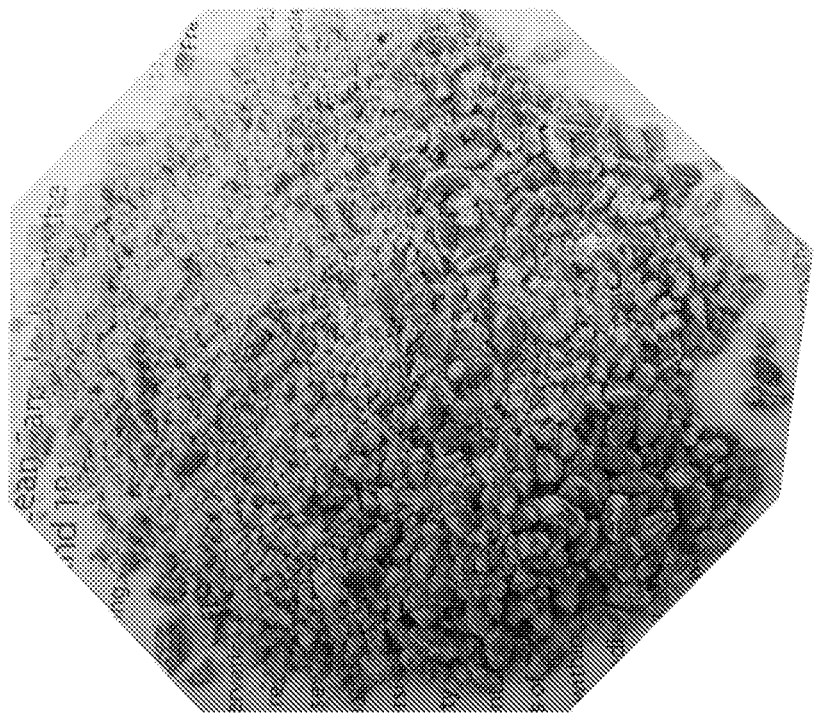
FIG. 9 is a perspective view of the resultant ground sample of wheat seeds ground in a 6801 vial in a vertical orientation based on conventional use.

Once again, the finely ground results are shown in FIG. 8. And again, the same sample conditions except with the jar in the vertical (upright) orientation yielded very poor results, as illustrated in FIG. 9.

Chilling the 6801 vial in liquid nitrogen or dry ice prior to grinding will improve the results. In other variations of Experiment 4, two to four 6801 vials could fit into a clamp, and the weight of the end plugs could be reduced. A larger version of the 6801 FM vial could also be used to provide cold chilling with the 25 oz size jar.

In accordance with the findings of the experiments described herein, testing continues to determine optimized conditions for large quantities of different sample types in different size containers varying the grinding balls and orientation.

It is optimal to use a container with a truly cylindrical interior surface, or as true a cylindrical surface as possible. A less precise cylindrical surface could prevent or disrupt circular ball action.

Jars of 25 oz (740 ml) have been used herein to optimize the circular ball motion and allow bigger grinding media. The present experiments, wherein the non-rotating jar motion is derived from the up/down vertical motion of the machine, are the first known to cause the circular ball motion at high speeds and to find the optimized diameter and ball size combination to produce such excellent grinding results.

FIG. 10 is a chart showing further test data. As listed in the chart, a 6881 FM vial has a capacity of 90 ml (3.04 oz). A 6751 FM vial has a capacity of 25 ml (0.85 oz). An 8002 Plastic Jar has a capacity of 135 ml (4.56 oz). It can be seen that many of the tests resulted in circular motion of the balls, and that a few showed chaotic dynamic motion that resulted in suboptimal grinding and/or failure.

As a result of the foregoing, the present invention is an entirely new class of Ball Mill that generates rotational/circular Ball motion. As opposed to a horizontal tumbler type ball mill, the jar used in the present invention does not rotate. Rather, the circular motion is generated through the up/down vertical motion of the ball mill (often referred to as a BeadBeater Ball Mill).

Vial sizes that can be accommodated in connection with the present invention are typically 250 ml or greater, but can also be 350 ml or greater, 500 ml or greater, or 740 ml or greater. One, two, three, or four or more jars can be oscillated at once.

Vial diameters that can be accommodated in connection with the present invention are typically 21 mm or greater, but can also be 34 mm or greater, 53 mm or greater, 56 mm or greater, or 89 mm or greater. For example, when the vial diameter is 56 and 89 mm, and the oscillation amplitude is 3.2 cm, this provides ratios of oscillation amplitude to vial diameter of 4:7 and 32:89. In one embodiment, ratios of oscillation amplitude to vial diameter of 4:7 to 32:89 are utilized.

Vial lengths that can be accommodated in connection with the present invention are typically 70 mm or greater, but can also be 82 mm or greater, 93 mm or greater, or 150 mm or greater.

Vials used in the methods of the present invention are oscillated or otherwise agitated, but are not rotated about their axis to cause agitation.

Speeds at which the present machines can oscillate the vials are 500 rpm or greater, 750 rpm or greater, 1000 rpm or greater, 1250 rpm or greater, 1500 rpm or greater, or 1750 rpm or greater. Ranges of 500-1750 rpm can be used. Ranges of 1000-1750 rpm can be used.

Ball diameters that can be accommodated in connection with the present invention are typically 4 mm or greater, but can also be 7 mm or greater, 8 mm or greater, 10 mm or greater, 12 mm or greater, or 14 mm or greater. These sizes are acceptable given the rotation of the balls about the internal surface of the vial, which avoids the rapid impaction that occurs in a typical ball mill setting with a vertically oscillated vial. Ball diameters of 8-14 mm can be used. Ball diameters of 10-14 mm can also be used. Balls of larger diameters are also heavier. The heavier balls tend to more quickly assume the circular motion described herein upon agitation. The weight of the balls contributes to this rapid assimilation into the circular motion, whereas smaller, lighter balls either take longer time to assume the circular motion or only assume chaotic motion upon agitation. Moreover, these larger balls coupled with the larger diameters of the vials used herein, coupled also with the high rpm of agitation, results in the balls being thrust around the circumference of the vials at very high speeds, such that the force of the balls is exceptionally high as it encounters the sample material, which aids in pulverizing the sample to create the superior results, as evidenced in the examples described herein.

The number of balls that can be accommodated in connection with the present invention is typically 10 or more, but can also be 15 or more, 20 or more, 25 or more, or 30 or more. Fewer than 10 balls can also be used. In theory, any number of balls could be used, with certain ranges being optimized for a particular speed, size, and sample type.

FIG. 11 shows an example of the cylindrical vial 50 described above. The cylindrical vial 50 includes a chamber defined by the two flat end walls and the cylindrical sidewall defining the central vial axis 52.

The present invention has found particularly superior results with dry samples, which have not been known to have been used in a horizontally oriented vial as described herein. Dry samples for grinding would be different than liquid samples having balls therein for purposes of mixing or shearing fluid through chaotic agitation. However, liquid samples may also be used and can have their components broken down or separated in accordance with the ball motion of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of grinding large sample quantities using a bead beater homogenizer, the method comprising steps of:
    loading a sample material into a vial having a size of 500 ml or greater having a chamber enclosed by two end walls and a cylindrical sidewall defining a central vial axis;
    loading a plurality of balls into the vial with the sample material;
    securing the vial to a movable platform of the homogenizer; and
    oscillating the platform in a back-and-forth motion isolated to a movement axis, thereby causing the balls to move in a circular motion along the cylindrical sidewall, wherein the central vial axis is perpendicular to the movement axis.

2. The method of claim 1, wherein the step of oscillating does not rotate the vial about the central vial axis.

3. The method of claim 1, wherein the step of oscillating includes oscillating the vial at 1500 rpm or greater.

4. The method of claim 1, wherein the step of oscillating includes oscillating the platform in a vertical motion.

5. The method of claim 1, wherein the step of oscillating includes oscillating the platform back and forth along a distance of 1.25 inches.

6. The method of claim 1, wherein the size of the vial is 740 ml or greater.

7. The method of claim 1, wherein a diameter of each ball is 7 mm or greater.

8. The method of claim 1, wherein the plurality of balls includes 10 or more.

9. The method of claim 1, wherein the cylindrical sidewall of the vial has a diameter of 56 mm or greater.

10. The method of claim 9, wherein the step of oscillating includes oscillating the platform back and forth along a distance of 3.2 cm.

11. The method of claim 1, wherein the vial has a length between the end walls along the central vial axis of 82 mm or greater.

12. The method of claim 1, wherein the step of loading the sample includes loading a substantially dry, non-liquid sample material into the vial.

13. A method of grinding large sample quantities using a bead beater homogenizer, the method comprising steps of:
   loading a sample material into a vial having a diameter of 56 mm or greater having a chamber enclosed by two end walls and a cylindrical sidewall defining a central vial axis;
   loading a plurality of balls into the vial with the sample material;
   securing the vial to a movable platform of the homogenizer; and
   oscillating the platform in a back-and-forth motion isolated to a movement axis along a distance of 3.2 cm, thereby causing the balls to move in a circular motion along the cylindrical sidewall, wherein the central vial axis is perpendicular to the movement axis.

14. A system comprising:
   a cylindrical vial having a chamber enclosed by two end walls and a cylindrical sidewall defining a central vial axis, wherein the vial has a size of 500 ml or greater; and
   a bead beater homogenizer for grinding large sample quantities comprising:
   a movable platform;
   a motor for oscillating the platform in a back-and-forth motion isolated to a movement axis, thereby causing rotation of the balls in a circular motion along the cylindrical sidewall;
   a vial holder configured to hold the cylindrical vial such that the central vial axis is perpendicular to the movement axis; and
   a clamp for securing the vial holder to the platform.

15. The system of claim 14, further comprising a plurality of balls to be placed within the vial.

16. The system of claim 15, wherein a diameter of each ball is 7 mm or greater.

17. The system of claim 14, wherein the motor is configured to oscillate the vial without rotating the vial about the central vial axis.

18. The system of claim 14, wherein the size of the vial is 740 ml or greater.

19. The system of claim 14, wherein the motor is configured to oscillate the vial at 1500 rpm or greater.

20. The system of claim 14, wherein the plurality of balls includes 10 or more.

* * * * *